(No Model.)
C. A. TATUM.
APPARATUS FOR SHAKING BEVERAGES.
No. 422,462. Patented Mar. 4, 1890.
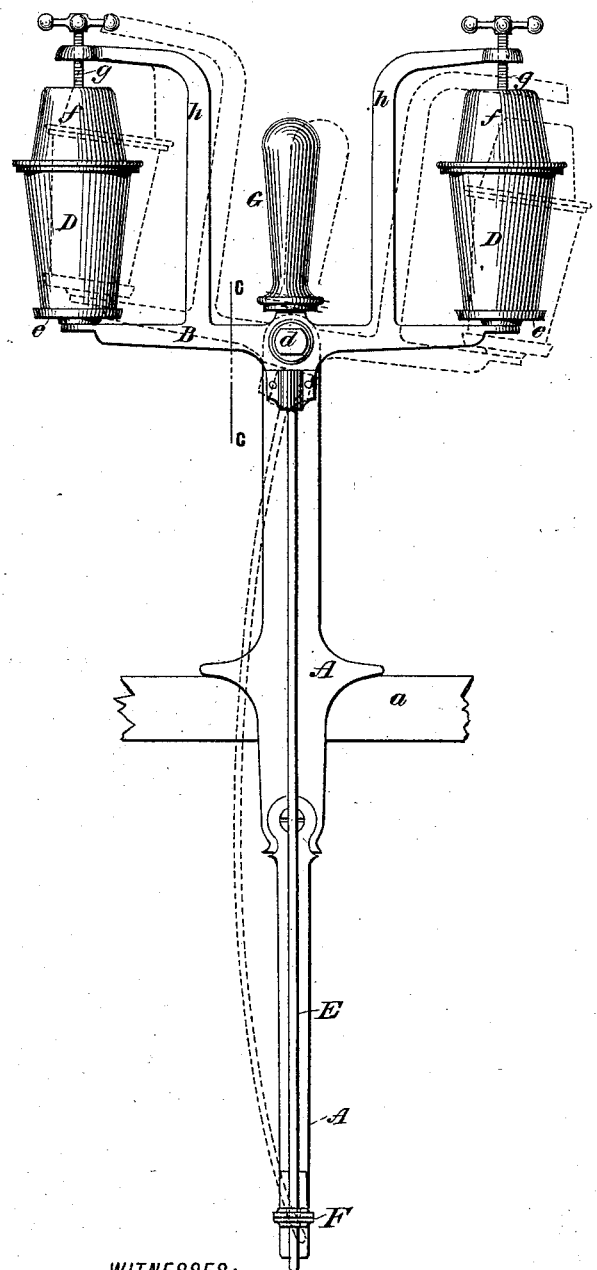
WITNESSES:
Gustave Dieterich
T. F. Bourne
INVENTOR
Charles A. Tatum
BY
Briesen, Steele & Knauth
ATTORNEYS.

UNITED STATES PATENT OFFICE.

CHARLES A. TATUM, OF NEW YORK, N. Y., ASSIGNOR TO WHITALL, TATUM & CO., OF SAME PLACE.

APPARATUS FOR SHAKING BEVERAGES.

SPECIFICATION forming part of Letters Patent No. 422,462, dated March 4, 1890.

Application filed May 18, 1889. Serial No. 311,223. (No model.)

*To all whom it may concern:*

Be it known that I, CHARLES A. TATUM, a resident of the city, county, and State of New York, have invented an Improved Apparatus for Shaking Beverages, of which the following is a specification.

The object of my invention is to provide an apparatus for shaking beverages that will be simple in construction, cheap to manufacture, and efficient in use.

The invention consists in the novel details of improvement and combinations of parts that will be more fully hereinafter set forth, and then pointed out in the claims.

Reference is to be had to the accompanying drawings, forming part of this specification, wherein—

Figure 1 is a front elevation of an apparatus constructed according to my invention. Fig. 2 is a side elevation of the same, partly in section, on the plane of the line $c\ c$, Fig. 1; and Fig. 3 is a similar view of a modification.

The letter A in the accompanying drawings represents a frame or upright that is adapted to be secured to a table or other support $a$ by means of a thumb-screw $b$, or otherwise made stationary.

B is a horizontal arm or bar that is pivoted to the frame A at $d$, so that it may rock on its pivot $d$, as indicated by dotted lines in Fig. 1. The rocking arm or bar B is adapted to carry one or more cups or other receptacles D, in which the beverage to be shaken may be placed. The cups D may be carried by the rocking arm B in any convenient manner. In the drawings they are shown resting upon disks $e$, carried by the arm B, and are covered by caps $f$, that are held down by screws $g$, that work in arms $h$ on the rocking bar B. The rocking arm B connects with a spring E, that passes at one end through an eye F on the frame A. The spring E in Figs. 1 and 2 is in the form of a long narrow blade, which is adapted to be freely bent, as indicated in dotted lines in Fig. 1; but any other kind of spring may be used. The rocking bar B is also preferably provided with a handle G, which may be grasped by the hand of the operator in using the apparatus.

In operating this apparatus to shake a beverage the latter is first placed in the cup D and its cap $f$ suitably fastened. The operator then grasps the handle G and moves the same back and forth, whereupon the arm B will be rocked on its pivot $d$ and the cups D moved as in dotted lines, Fig. 1. As the arm B is thus rocked, the spring E will be bent and strained alternately in opposite directions, imparting to the arm B and to the cup it carries a peculiar vibration, which will produce the desired result of thoroughly shaking the contents of the cup.

In the modification shown in Fig. 3 the spring E is spiral, and is connected at one end with the frame A at $F^2$ and at its other end with an arm $B^2$, projecting from the bar B. The action of the spring E in Fig. 3 is similar to that in Figs. 1 and 2.

Having now described my invention, what I claim is—

1. The frame A and rocking cup-bearing arm B, pivoted thereto, combined with the spring E, and handle G, connected to said bar B, the spring E, extending downwardly from one side of said rocking bar, and the handle G, extending in the opposite direction and from the opposite side of said bar B and in line with the spring E, substantially as described.

2. The stationary frame A and rocking bar B, pivoted to the frame A, and having the disk $e$, arm $h$, and cap $f$, combined with the removable receptacle D, carried by the bar B, and the spring E, which is connected with the bar B and with the stationary frame A, substantially as described.

CHARLES A. TATUM.

Witnesses:
O. H. LESTER,
HARRY M. TURK.